UNITED STATES PATENT OFFICE.

PATRICK MOLYNEUX, OF LONDON, ENGLAND.

DISINFECTANT AND MODE OF PREPARING SAME.

SPECIFICATION forming part of Letters Patent No. 514,235, dated February 6, 1894.

Application filed May 16, 1893. Serial No. 474,446. (No specimens.) Patented in England April 4, 1893, No. 6,953.

*To all whom it may concern:*

Be it known that I, PATRICK MOLYNEUX, a subject of the Queen of Great Britain, residing at 30 Bruce Road, Bow, London, in the county of Middlesex, England, have invented certain new and useful Improvements in or Connected with Disinfectants, (for which I have made application, conjointly with Gabriel Rawlings Potts, for Letters Patent in England, No. 6,953, dated April 4, 1893;) and I do hereby declare that the following is a full, clear, and exact description of the invention, which will enable others skilled in the art to which it appertains to make and use the same.

My invention relates to improvements in or connected with disinfectants by which certain advantages are obtained.

In order that the nature of my invention may be readily understood, I shall proceed to describe, mainly by way of a type or example, one way by which I may carry my invention into effect and manufacture disinfectants existing in the form of a liquid, a paste or a powder of great efficiency.

My improvements consist in the manufacture of disinfectants substantially in the manner and in the proportions hereinafter set forth.

I take Black Sea oil which is the crude petroleum imported from the Black Sea ports and creosote in proportions of one half pint of Black Sea oil and a pint of creosote of a specific gravity of from .790 to .800. These ingredients I thoroughly mix in a pan or other suitable vessel and then raise the temperature of the mixture to about 180° Fahrenheit. Next I blend or mix with the above described compound an equal weight or thereabout of a solution of caustic soda of about twenty-five gravity (degree of Twaddle's hydrometer). After thoroughly mixing the three above ingredients in about the proportions above mentioned, I allow the whole to cool and stand for about one week.

For the sake of convenience of description I shall hereinafter refer to the above specified compound as compound A.

Proceeding with the manufacture, I then take resin and a solution of caustic soda in proportions of about one pound of resin to about every half pint of solution of caustic soda of twenty degrees (Twaddle's hydrometer) or thereabout and stir and incorporate them thoroughly at a temperature sufficiently high (say about 160° Fahrenheit) to dissolve the resin. I then add creosote of a specific gravity of .790 to .800, and in bulk equal to the combined ingredients last named, and thoroughly mix by stirring or agitating and bring the mass to a temperature of 190° to 200° Fahrenheit or thereabout.

For the sake of convenience of description I shall hereinafter refer to this second described compound as the compound B.

In proceeding, I next mix the compounds A and B in the proportion of about one third part by bulk of the compound A to about one part by bulk of the compound B and agitate the mass until it becomes frothy, after which I allow it to cool down to a temperature of about 120° Fahrenheit. Then I add to every ton of the combined compounds A and B a mixture of about five pounds of the substance commercially known as albo-carbon (which is a white solid form of napthalene) dissolved in about one gallon of creosote of .790 to .800 gravity or thereabout. Finally the mass so formed I thoroughly mix and allow to cool and settle. After cooling, a sediment is deposited at the bottom of the vessel in which the mixture has been made and allowed to cool, and the effluent from this sediment constitutes a liquid disinfectant. I now mix with the residual sediment new lime, freshly slaked, in the proportion of about one gallon of sediment to every fourteen pounds or thereabout of the new lime. After a thorough turning over with shovels or by other means I allow the mass to cool and stand for about twelve hours, when it is ground in a mill to a powder and constitutes a disinfectant powder.

When it is desired to prepare my disinfectant in the form of a paste, I leave sufficient liquid with the sediment to form a pasty mass which if desired may be pressed into blocks in molds for subsequent use.

I do not confine myself to the above proportions of the several ingredients or temperatures as these may be varied somewhat without departing from the nature of my invention, but those I have set forth are found to give good results.

I claim—

1. The herein-described disinfectant consisting of a mixture of Black Sea oil, creosote, caustic soda, resin, and napthalene.

2. The herein-described disinfectant consisting of a mixture of Black Sea oil, creosote, caustic soda, resin, napthalene, and fresh slaked lime.

3. The herein-described process of manufacturing disinfectants which consists in; first, heating an admixture of Black Sea oil and creosote, adding thereto caustic soda and allowing the same to cool and stand for a considerable time; second, adding creosote to a solution of resin and caustic soda and heating the solution; third, then adding together the two said mixtures, and; fourth, incorporating therewith a solution of napthalene and creosote.

4. The herein-described process of manufacturing disinfectants which consists in; first, in raising the temperature of an admixture of Black Sea oil and creosote to about 180° Fahrenheit, blending therewith caustic soda and allowing the same to cool and stand for a considerable time; second, dissolving resin in a solution of caustic soda raised to a temperature of about 160° Fahrenheit and combining therewith creosote and heating the mass to a temperature of about from 190° to 200° Fahrenheit; third, then adding together the two said mixtures and allowing the same to cool down to a temperature of about 120° Fahrenheit, and; fourth, then combining with the aforesaid compound a mixture of napthalene dissolved in creosote.

PATRICK MOLYNEUX.

Witnesses:
KENNETH L. SKINNER,
H. S. TURNER.